(12) United States Patent
Liang et al.

(10) Patent No.: US 8,582,300 B2
(45) Date of Patent: Nov. 12, 2013

(54) HOLDING DEVICE FOR HARD DISK DRIVE

(75) Inventors: An-Gang Liang, Shenzhen (CN);
Ping-Chuan Deng, Shenzhen (CN); Lin Du, Shenzhen (CN); Fei Teng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 139 days.

(21) Appl. No.: 13/158,474

(22) Filed: Jun. 13, 2011

(65) Prior Publication Data
US 2012/0273435 A1 Nov. 1, 2012

(30) Foreign Application Priority Data

Apr. 26, 2011 (CN) .......................... 2011 1 0104947

(51) Int. Cl.
*H05K 5/00* (2006.01)
(52) U.S. Cl.
USPC ........................................................ 361/724
(58) Field of Classification Search
USPC ........... 211/26; 312/223.1, 223.2, 319.1, 333, 312/334.4, 334.5; 248/27.3, 27.1, 220.21, 248/223.41, 222.14, 300; 361/679.37–679.39, 728–732
See application file for complete search history.

(56) References Cited

U.S. PATENT DOCUMENTS

| | | | | |
|---|---|---|---|---|
| 5,734,557 A * | 3/1998 | McAnally et al. | ............ | 361/727 |
| 6,343,009 B1 * | 1/2002 | Liu et al. | .................. | 361/679.31 |
| 6,373,695 B1 * | 4/2002 | Cheng | ....................... | 361/679.39 |
| 6,556,432 B2 * | 4/2003 | Chen et al. | ............... | 361/679.33 |
| 6,757,164 B2 * | 6/2004 | Lin | .......................... | 361/679.35 |
| 6,826,045 B2 * | 11/2004 | Chen | ......................... | 361/679.33 |
| 7,019,966 B2 * | 3/2006 | Lee | .......................... | 361/679.36 |
| 7,088,579 B1 * | 8/2006 | Konshak | .................. | 361/679.32 |
| 7,359,189 B2 * | 4/2008 | Chiang et al. | ............ | 361/679.33 |
| 7,580,253 B1 * | 8/2009 | Chen et al. | ............... | 361/679.33 |
| 8,004,830 B2 * | 8/2011 | Lu | ............................. | 361/679.33 |
| 8,064,195 B2 * | 11/2011 | Zhang et al. | ............. | 361/679.33 |
| 2005/0072745 A1 * | 4/2005 | Schmidtk et al. | ............... | 211/26 |
| 2008/0259554 A1 * | 10/2008 | Qin et al. | ....................... | 361/685 |
| 2008/0298005 A1 * | 12/2008 | Deng et al. | .................... | 361/684 |
| 2010/0165564 A1 * | 7/2010 | Lu | ............................. | 361/679.35 |

* cited by examiner

*Primary Examiner* — Darnell Jayne
*Assistant Examiner* — Hiwot Tefera
(74) *Attorney, Agent, or Firm* — Altis & Wispro Law Group, Inc.

(57) ABSTRACT

A holding device includes a loading frame and two mounting plates. The loading frame includes a base portion for loading an HDD and a pair of sidewalls perpendicularly extending from the base portion. The sidewalls are parallel to each other. Each sidewall includes two sliding ribs substantially perpendicularly extending from a surface thereof away from the other sidewall. The two mounting plates are opposite to each other. Each mounting plate includes two guiding rails substantially perpendicularly extending from a surface thereof toward the other mounting plate. The two sliding ribs of each sidewall are configured to be slid into the two guiding rails of a corresponding mounting plate.

15 Claims, 4 Drawing Sheets

HOLDING DEVICE FOR HARD DISK DRIVE

BACKGROUND

1. Technical Field

The disclosure generally relates to holding devices and, particularly, to a holding device for holding hard disk drives (HDDs).

2. Description of Related Art

HDDs are mostly firmly fastened to mounting plates with a number of screws. In particular, the HDD defines a number of screw holes. The mounting plates define a number of through holes corresponding to the screw holes. The screws are passed through the corresponding through holes and then are engaged with the corresponding screw holes. However, the employment of the screws decreases the efficiency of the assembly process of the HDD.

Therefore, what is needed is a holding device for holding an HDD, which can overcome the above shortcoming.

DETAILED DESCRIPTION

Embodiments of the present disclosure will now be described in detail below and with reference to the drawings.

Figure 1:
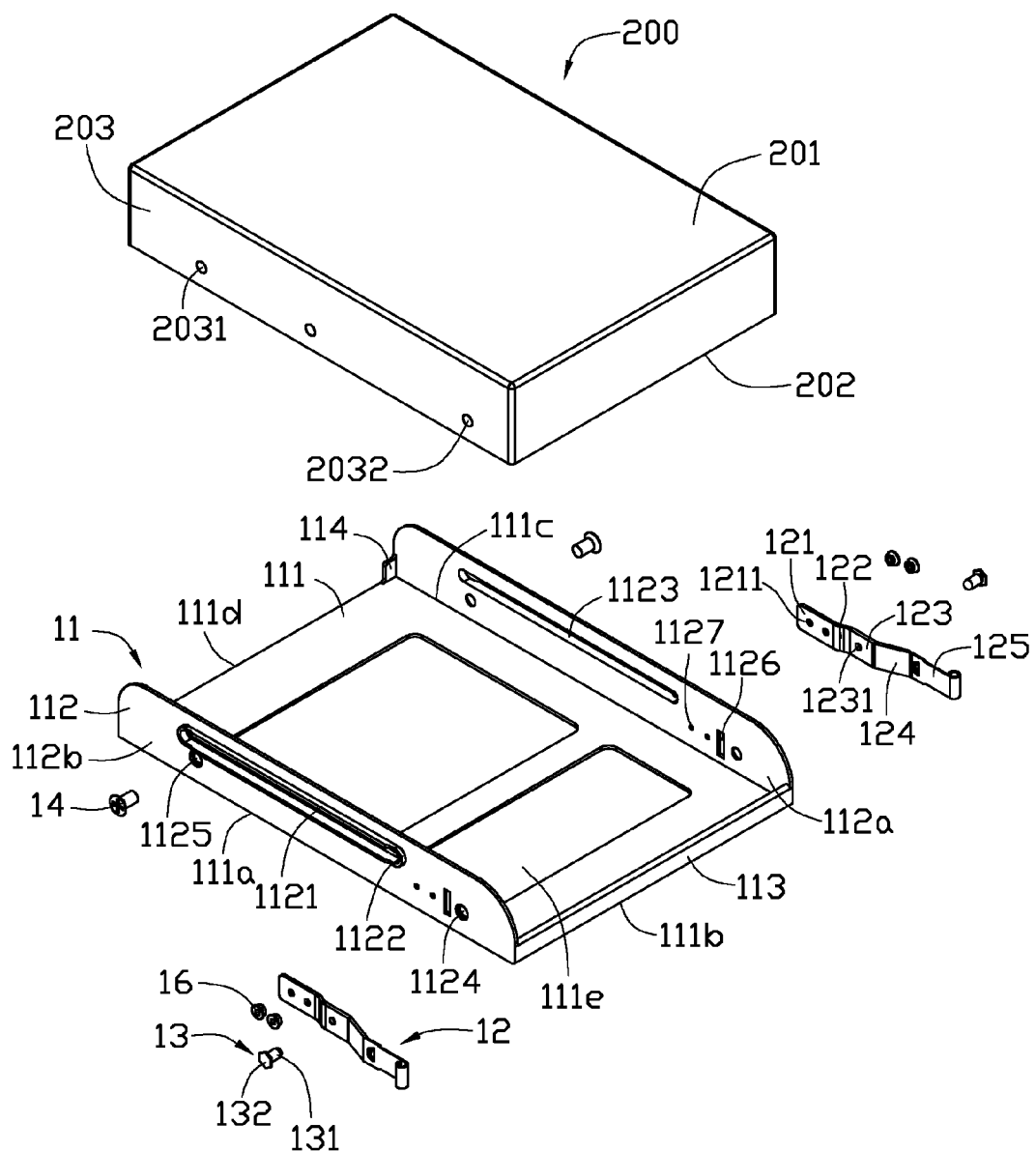
FIG. 1 is an isometric, exploded view of a loading frame of a holding device and an HDD in accordance with an exemplary embodiment.
Figure 2:
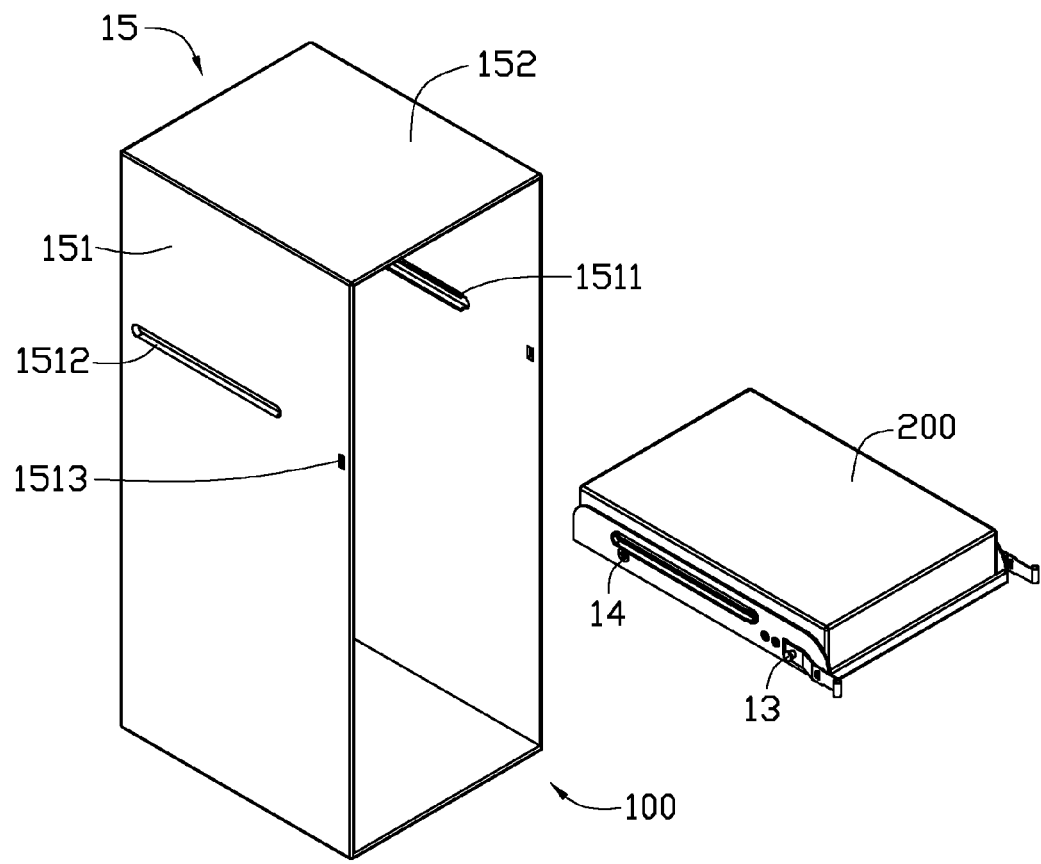
FIG. 2 is an isometric, partially assembled view of the holding device and the HDD.

Referring to FIG. 1 and FIG. 2, a holding device 100 in accordance with an exemplary embodiment is shown. The holding device 100 is configured for holding an HDD 200. The HDD 200 is generally cuboid and includes a top surface 201, a bottom surface 202 opposite to the top surface 201, and a pair of side surfaces 203. The side surfaces 203 are parallel and opposite to each other. Each side surface 203 defines a screw hole 2031 and a blind hole 2032 respectively located adjacent to two ends of the side surface 203.

The holding device 100 includes a loading frame 11, a pair of elastic plates 12, a pair of insertion poles 13, a pair of screws 14, and a receiving frame 15.

The loading frame 11 is integrally formed by stamping. The loading frame 11 includes a base portion 111, a pair of sidewalls 112, a limitation wall 113, and a limitation portion 114. The base portion 111 is generally rectangular, and an area of the base portion 111 corresponds to that of the bottom surface 202. The area of the base portion 111 is equal to or slightly greater than that of the bottom surface 202. The base portion 111 includes a first side 111a, a second side 111b perpendicularly connecting to the first side 111a, a third side 111c substantially parallel to the first side 111a, and a fourth side 111d substantially parallel to the second side 111b. The base portion 111 defines two rectangular heat dissipation holes 111e passing through the base portion 111. The sidewalls 112 are substantially parallel to each other. The sidewalls 112 respectively and perpendicularly extend upward from the first side 111a and the third side 111c. The limitation wall 113 extends upward from the second side 111b along a direction that the sidewalls 112 extend. The limitation portion 114 extends from the fourth side 111d, adjacent to the third side 111c.

Each sidewall 112 is generally a rectangular plate and includes a first surface 112a adjacent to the other sidewall 112, a second surface 112b opposite to the first surface 112a, two sliding ribs 1121 perpendicularly extending up from the second surface 112b, and two connection portions 1122. The sliding ribs 1121 are parallel to each other. Each connection portion 1122 is an arc-shaped rib, positioned at a distal end of the sliding ribs 1121 and connects the two sliding ribs 1121 to enhance the two sliding ribs 1121.

Each sidewall 112 defines a first opening 1123, a first through hole 1124, a second through hole 1125, a mounting hole 1126, and two first riveting holes 1127, passing through the first surface 112a and the second surface 112b. The first opening 1123 is positioned between the two sliding ribs and surrounded by the two sliding ribs 1122 and the connection portions 1122. The first through hole 1124 is corresponding to the blind hole 2032 adjacent to the second side 111b. The second through hole 1125 is corresponding to the screw hole 2031 adjacent to the fourth side 111d. The two first riveting holes 1127 are adjacent to the first through hole 1124. The mounting hole 1126 is positioned between the first through hole 1124 and the two first riveting holes 1127.

Each elastic plate 12 is made of metal by stamping. Each elastic plate 12 is generally an elongated plate and includes a riveting portion 121, a bending portion 122, a mounting portion 123, a clamping portion 124, and a pressing portion 125.

The riveting portion 121 is generally a planar plate and defines two second riveting holes 1211. The second riveting holes 1211 are corresponding to the first riveting holes 1127. The bending portion 122 outwardly extends from one end of the riveting portion 121. The mounting portion 123 extends from one end of the bending portion 122 away from the riveting portion 121. The mounting portion 123 defines a receiving hole 1231. The receiving hole 1231 corresponds to the first through hole 1124. The clamping portion 124 outwardly extends from one end of the mounting portion 123 away from the bending portion 122. The clamping portion 124 is substantially parallel to the bending portion 122. The pressing portion 125 extends from one end of the clamping portion 124 away from the mounting portion 123. The pressing portion 125 is substantially parallel to the riveting portion 121 and includes a protrusion 1251 and an operation portion 1252 (see FIG. 4). The protrusion 1251 is substantially hemispherical and protrudes from one side of the pressing portion 125 away from the other pressing portion 125. The operation portion 1252 is substantially cylindrical bent from a distal end of the pressing portion 125.

Each insertion pole 13 includes a cylindrical insertion portion 131 and a head portion 132 coaxially connected with the insertion portion 131. A diameter of the insertion portion 131 is corresponding to that of the receiving hole 1231. The head portion 132 is substantially cylindrical and has a diameter greater than that of the insertion portion 131.

Each screw 14 corresponds to the second through hole 1125 and the screw hole 2031.

The receiving frame 15 includes a pair of mounting plates 151 opposite to each other and a pair of connection plates 152 perpendicularly connect between the mounting plates 151. A distance between the mounting plates 151 is slightly greater than that between the two sidewalls 112.

Each mounting plate 151 includes two guiding rails 1511 and defines a second opening 1512 and a clamping hole 1513. The guiding rails 1511 extend from an inner surface of one mounting plate 151 toward the other mounting plate 151. A distance between the two guiding rails 1511 is slightly greater than that between the two sliding ribs 1121. The second opening 1512 is positioned between the guiding rails 1511.

The clamping hole 1513 is a through hole and positioned adjacent to one end of the guiding rails 1511. The clamping hole 1513 is configured to receive the protrusion 1251.

Figure 3:
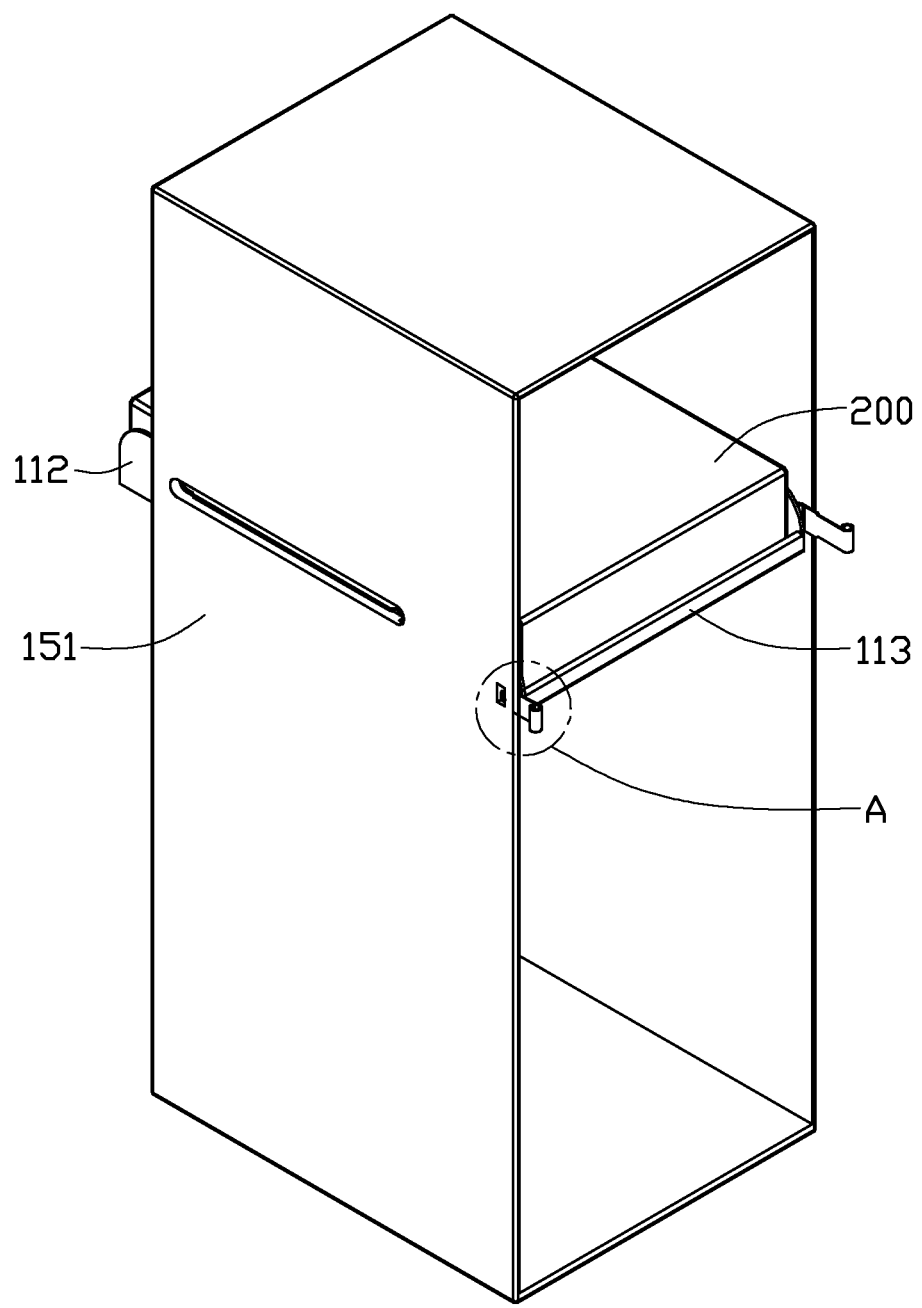
FIG. 3 is an isometric, assembled view of the holding device and the HDD of FIG. 2.
Figure 4:
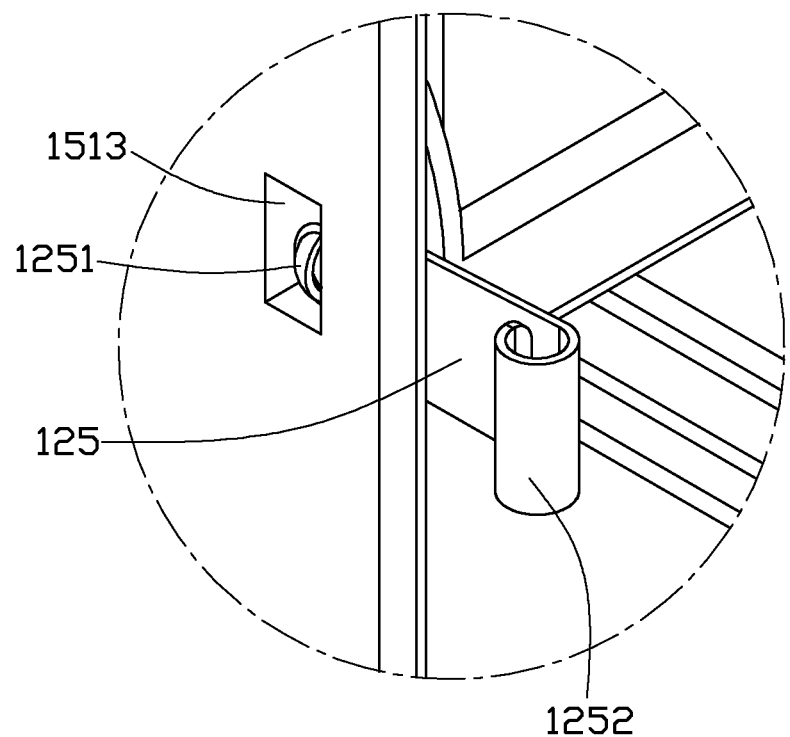
FIG. 4 is an enlarged view of a circled portion A of FIG. 3.

Referring also to FIGS. 3-4, in assembly, each mounting portion 121 is inserted through a corresponding mounting hole 1126 from the second surface 112b so that the riveting portion 121 attaches on the first surface 121a, and the bending portion 122 is clamped in the mounting hole 1126. The first riveting holes 1127 are aligned with the second riveting holes 1211. Each elastic plate 12 is riveted to a corresponding sidewall 112 by two rivets 16 passing through the corresponding first riveting holes 1127 and the second riveting holes 1211. A distance between two pressing portions 125 of the two elastic plates 12 is slightly greater than that between the two mounting plates 151. Then the HDD 200 is placed on the base portion 111. The screw hole 2031 is aligned with the second through hole 1125. The blind hole 1231 is aligned with the first through hole 1124 and the receiving hole 1231. The insertion portion 131 of the each pole is sequentially passing the corresponding receiving hole 123, the first through hole 1124 and then is inserted into the blind hole 2032. Each screw 14 passes through the second through hole 1125 and engages with the corresponding screw hole 2031. Then the sliding ribs 1121 are slid into the guiding rails 1512. Each pressing portion 125 presses on an inside surface of a corresponding mounting plate 151. Thus, the loading frame 11 is connected to the receiving frame 15.

The heat dissipation holes 111e, the first opening 1123, and the second opening 1512 can efficiently dissipate heat of the HDD 200 when the HDD is working.

To disassemble the HDD 200, the two pressing portions 125 are pressed toward each other, the sliding ribs 1121 are slid out of the guiding rails 1511, and then the insertion poles 13 and the screws 14 are disengaged from the HDD 200 and the loading frame 11.

In an alternative embodiment, the screws 14 can be omitted, and the HDD 200 is connected to the loading frame 11 by the insertion poles 13.

In a further alternative embodiment, both insertion poles 13 and the screws 14 can be omitted, and the HDD 200 is placed on the loading frame 11. The loading frame 11 is engaged with the receiving frame 15 by the corresponding sliding ribs 1121 and the corresponding guiding rails 1511.

It is understood that the above-described embodiment is intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A holding device for holding an HDD, comprising:
 a loading frame comprising:
  a base portion for loading the HDD; and
  a pair of sidewalls substantially perpendicularly extending from the base portion, the sidewalls being parallel to each other, each sidewall comprising:
   two sliding ribs substantially perpendicularly extending from a surface thereof away from the other sidewall; and
   a mounting hole defined therein;
  two mounting plates opposite to each other, each mounting plate comprising two guiding rails substantially perpendicularly extending from an inner surface thereof toward the other mounting plate and defining a clamp hole, and the two sliding ribs of each sidewall being configured to be slid into the two guiding rails of a corresponding mounting plate; and
 a pair of elastic plates, each elastic plate comprising a riveting portion, a bending portion bending towards the bending portion of the other one of the pair of elastic plates, a mounting portion, a clamping portion, and a pressing portion, the bending portion outwardly extending from one end of the riveting portion, the mounting portion extending from one end of the bending portion away from the riveting portion, the clamping portion outwardly extending from one end of the mounting portion away from the bending portion, and being substantially parallel to the bending portion, the pressing portion extending from one end of the clamping portion away from the mounting portion along a direction substantially parallel to the riveting portion and comprising a protrusion and an operation portion, the protrusion protruding from one side of the pressing portion away from the pressing portion of the other one of the pair of elastic plates, and the operation portion bending from a distal end of the pressing portion;
 wherein each bending portion is clamped in a corresponding mounting hole, and each clamping hole receives the protrusion protruding from a corresponding pressing portion.

2. The holding device of claim 1, wherein the base portion is a rectangular plate and comprises a first side, a second side perpendicularly connecting with first side, a third side parallel to the first side, and a fourth side parallel to the second side, the pair of the sidewalls respectively extend from the first side and the third side, and the loading frame further comprises a limitation wall perpendicularly extending from the second side and a limitation portion perpendicularly extending from the fourth side adjacent to the third side.

3. The holding device of claim 1, wherein each sidewall defines a first opening positioned between the two sliding ribs.

4. The holding device of claim 1, wherein each mounting plate defines a second opening positioned between the two guiding rails.

5. The holding device of claim 1, further comprising a pair of insertion poles, wherein the mounting portion defines a receiving hole, each sidewall defines a first through hole corresponding to the receiving hole, and each insertion pole is sequentially passed through the receiving hole and the first through hole and received in the HDD.

6. The holding device of claim 5, wherein a distance between two pressing portions of the pair of elastic plates is greater than a distance between the two mounting plates, and each pressing portion presses on the inner surface of a corresponding mounting plate.

7. The holding device of claim 6, further comprising a pair of screws, wherein each sidewall further defines a second through hole, and each screw is passed through a corresponding second through hole and engaged with the HDD.

8. The holding device of claim 6, wherein the protrusions are both semispherical protrusions.

9. The holding device of claim 6, further comprising two rivets, wherein each sidewall further defines a first riveting hole, each riveting portion defines a second riveting hole corresponding to the first riveting hole, and each riveting portion is riveted to a corresponding sidewall by a corresponding rivet passing through a corresponding first riveting hole and a corresponding second riveting hole.

10. The holding device of claim 1, wherein the base portion defines two rectangular heat dissipation holes.

11. The holding device of claim 1, wherein each sidewall further comprises two connection portions in arc shape, and each connection portion is positioned at distal ends of the sliding ribs and connected between the sliding ribs.

12. A holding device for holding an HDD, comprising:
a loading frame comprising:
   a base portion; and
   a pair of sidewalls substantially perpendicularly extending from the base portion, the sidewalls being parallel to each other, each sidewall comprising:
      two sliding ribs substantially perpendicularly extending from a surface thereof away from the other sidewall; and
      a mounting hole defined therein;
two mounting plates opposite to each other, each mounting plate comprising two guiding rails substantially perpendicularly extending from an inner surface thereof toward the other mounting plate and defining a clamp hole; and
a pair of elastic plates, each elastic plate comprising a riveting portion, a bending portion bending towards the bending portion of the other one of the pair of elastic plates, a mounting portion, a clamping portion, and a pressing portion, the bending portion outwardly extending from one end of the riveting portion, the mounting portion extending from one end of the bending portion away from the riveting portion, the clamping portion outwardly extending from one end of the mounting portion away from the bending portion, and being substantially parallel to the bending portion, the pressing portion extending from one end of the clamping portion away from the mounting portion along a direction substantially parallel to the riveting portion and comprising a protrusion and an operation portion, the protrusion protruding from one side of the pressing portion away from the other one of the pair of elastic plates, and the operation portion bending from a distal end of the pressing portion;
wherein the two sliding ribs of each sidewall are slid into the two guiding rails of a corresponding mounting plate, each bending portion is clamped in a corresponding mounting hole, and each clamping hole receives the protrusion protruding from a corresponding pressing portion, so as to connect the loading frame to the two mounting plates.

13. The holding device of claim 12, further comprising two rivets, wherein each sidewall defines a first riveting hole, each riveting portion defines a second riveting hole corresponding to the first riveting hole, and each riveting portion is riveted to a corresponding sidewall by a corresponding rivet passing through a corresponding first riveting hole and a corresponding second riveting hole.

14. The holding device of claim 13, further comprising a pair of insertion poles, wherein the mounting portion of each elastic plate defines a receiving hole, each sidewall further defines a first through hole corresponding to the receiving hole of a respective mounting portion, and each insertion pole is sequentially passed through a corresponding receiving hole and a corresponding first through hole and received in the HDD.

15. The holding device of claim 14, wherein a distance between the two pressing portions of the pair of elastic plates is greater than a distance between the two mounting plates.

* * * * *